United States Patent
Banerjee et al.

(10) Patent No.: US 8,978,139 B1
(45) Date of Patent: Mar. 10, 2015

(54) METHOD AND APPARATUS FOR DETECTING MALICIOUS SOFTWARE ACTIVITY BASED ON AN INTERNET RESOURCE INFORMATION DATABASE

(75) Inventors: Anindya Banerjee, Pune (IN); Basant Rajan, Pune (IN); Neeran Mohan Karnik, Pune (IN); Bijayalaxmi Nanda, Pune (IN)

(73) Assignee: Symantec Corporation, Mountain View, CA (US)

( * ) Notice: Subject to any disclaimer, the term of this patent is extended or adjusted under 35 U.S.C. 154(b) by 1144 days.

(21) Appl. No.: 12/494,165

(22) Filed: Jun. 29, 2009

(51) Int. Cl.
*H04L 29/06* (2006.01)

(52) U.S. Cl.
USPC .......................................................... 726/24

(58) Field of Classification Search
CPC ......... G06F 11/30; G06F 11/00; G06F 21/51; G06F 21/53; G06F 21/56; G06F 21/00; G06F 21/50; G06F 21/52; G06F 21/55
USPC .......................................................... 726/24
See application file for complete search history.

(56) References Cited

U.S. PATENT DOCUMENTS

| | | | |
|---|---|---|---|
| 2006/0031483 A1* | 2/2006 | Lund et al. | 709/224 |
| 2006/0075468 A1* | 4/2006 | Boney et al. | 726/2 |
| 2006/0253458 A1* | 11/2006 | Dixon et al. | 707/10 |
| 2008/0301796 A1* | 12/2008 | Holostov et al. | 726/12 |
| 2009/0007100 A1* | 1/2009 | Field et al. | 718/1 |

* cited by examiner

*Primary Examiner* — William Goodchild
(74) *Attorney, Agent, or Firm* — Wilmer Cutler Pickering Hale & Dorr LLP

(57) ABSTRACT

A method and apparatus for detecting malicious software activity, using at least one processor, based on an Internet resource information database in memory is described. In one embodiment, a method for detecting malicious software activity, using at least one processor, based on an Internet resource information database in memory includes processing Internet activity to determine source and time information associated with at least one application download, comparing the Internet resource information database with the source and time information associated with the at least one application download to identify at least one suspicious application, and monitoring execution of the at least one suspicious application.

20 Claims, 5 Drawing Sheets

METHOD AND APPARATUS FOR DETECTING MALICIOUS SOFTWARE ACTIVITY BASED ON AN INTERNET RESOURCE INFORMATION DATABASE

BACKGROUND

1. Field of the Invention

Embodiments of the present invention generally relate to computer security systems and, more particularly, to a method and apparatus for detecting malicious software activity based on an Internet resource information database.

2. Description of the Related Art

Widespread Internet usage by most organizations results in an increase in computer system attacks. Various malicious software programs (e.g., viruses, Trojan horses, worms and/or the like) cause many of these computer system attacks. These malicious software programs may be transmitted (i.e. downloaded) to a vulnerable computer without user consent and/or knowledge as executable programs, email attachments, malicious HTML code on web pages and/or the like.

The malicious software programs may exert control over an operating system and modify various files (e.g., system registry entries) in order to disrupt operation of a computer system. The malicious software programs may also exploit the computer system for illegitimate purposes (e.g., misappropriate sensitive data, such as intellectual property, customer data, medical histories, financial records, purchase orders, legal documents, privileged and/or confidential information, social security numbers, addresses, pictures, documents, contacts, and/or the like). For example, hackers may design rootkits to hide processes, files and activities from the authorized user of the computer system.

Organizations having computers that are exposed to the Internet may employ various security software programs (e.g., anti-virus, anti-spyware and/or anti-phishing software programs) to detect and prevent the execution of such malicious software programs. The security software programs utilize behavior and/or static analysis to detect the malicious software programs. These security software programs may monitor the computer system using pre-defined activity-based and/or code-based signatures. These security software programs may also provide various remedial measures, such as quarantining, repairing or deleting infected files.

The security software programs, however, depend upon prior knowledge of such signatures and therefore, are limited to detecting malicious software programs for which appropriate signature are available. These security software programs may fail to recognize behavior and/or software code associated with the malicious software programs. Accordingly, the security software programs are unable to detect a malicious software program for which a code-based signature or an activity-based signature is unknown.

Additionally, the security software programs maintain information (e.g., a white list) regarding legitimate websites, publishers (e.g., vendors) and/or the like. Downloading applications from legitimate websites and/or publishers would be most likely safe. For example, the user may safely download a software package from www.symantec.com because the SYMANTEC is well-known for providing legitimate software programs. There are, however, many websites and/or the publishers that are illegitimate and/or unknown. If the user downloads one or more applications from such websites and/or publishers, the execution of the one or more application may corrupt critical data and/or crash the computer system.

Therefore, there is a need in the art for a method and apparatus for detecting malicious software activity based on an Internet resource information database.

SUMMARY OF THE INVENTION

Embodiments of the present invention comprise a method and apparatus for detecting malicious software activity, using at least one processor, based on an Internet resource information database in memory. In one embodiment, a method for detecting malicious software activity, using at least one processor, based on an Internet resource information database in memory includes processing Internet activity to determine source and time information associated with at least one application download, comparing the Internet resource information database with the source and time information associated with the at least one application download to identify at least one suspicious application and monitoring execution of the at least one suspicious application.

In some embodiments, the execution of the suspicious application may be terminated. In some embodiments, the execution of the suspicious application is monitored in a virtual machine. In some embodiments, input/output activity associated with the execution of the suspicious application is monitored and/or prevented. In some embodiments, network activity associated with the execution of the suspicious application is monitored and/or prevented. In some embodiments, a connection request to an external computer from the suspicious application is blocked. In some embodiments, the Internet resource information database comprises at least one of user reputation data or publisher reputation data associated with a plurality of applications. In some embodiments, the Internet resource information database comprises at least one of content rating data, global threat indicia or a reputation history associated with a plurality of sources. In some embodiments, the execution of the at least one suspicious application is transformed.

In another embodiment, an apparatus for detecting malicious software activity, using at least one processor, based on an Internet resource information database in memory is provided. The apparatus includes means for identifying source and time information associated with at least one application download, means for comparing the Internet resource information database with the source and time information associated with the at least one application download to identify at least one suspicious application and means for monitoring execution of the at least one suspicious application.

In some embodiments, the apparatus further includes means for transforming the activities associated with the execution of at least one suspicious application. In some embodiments, the apparatus further includes means for executing the at least one suspicious application in a virtual machine. In some embodiments, the apparatus further includes means for terminating the execution of the at least one suspicious application. In some embodiments, the apparatus further includes means for preventing input/output activity associated with the execution of the at least one suspicious application. In some embodiments, the apparatus further includes means for preventing network activity associated with the execution of the at least one suspicious application.

In yet another embodiment, a computer-readable-storage medium is provided. The computer-readable-storage medium comprising one or more processor-executable instructions that, when executed by at least one processor, causes the at least one processor to examine Internet activity to determine source and time information associated with at least one downloaded application, access an Internet resource information database, identify at least one suspicious application and monitor execution of the at least one suspicious application.

In some embodiments, the one or more processor-executable instructions may terminate the execution of the at least one suspicious application. In some embodiments, the one or more processor-executable instructions may transform the execution of the at least one suspicious application. In some embodiments, the one or more processor-executable instructions may prevent input/output activity associated with the execution of the at least one suspicious application. In some embodiments, the one or more processor-executable instructions may block a connection request to an external computer from the at least one suspicious application.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

As explained in detail further below, various embodiments of the present disclosure detect malicious software activity based on an Internet resource information database. As computer users download various applications from various Internet resources (e.g., web pages, File Transfer Protocol (FTP) sites), a monitor module determines source and time information associated with the downloaded applications. In some embodiments, the monitor module identifies a source Uniform Resource Locator (URL) of a source webpage as well as a timestamp associated with a particular downloaded application. Based on the source URL and the timestamp, the monitor module determines whether the particular downloaded application may include malicious software code. In some embodiments, the monitor module monitors activities associated with execution of the particular downloaded application in order to detect the malicious software activity. In some embodiments, the monitor module mitigates the malicious software activity by terminating the execution of the particular downloaded application.

Figure 1:
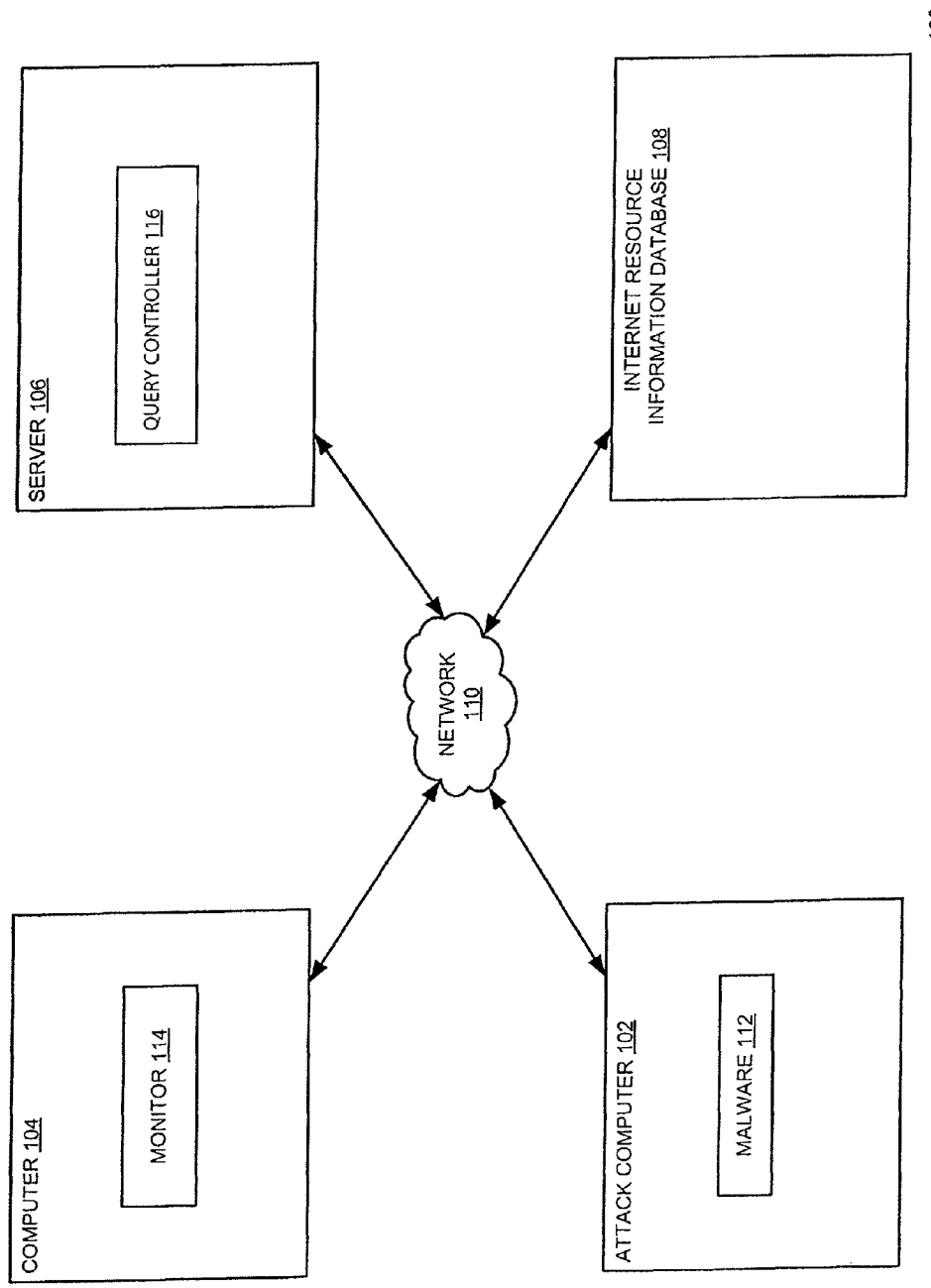
FIG. 1 is a block diagram of a system for detecting malicious software activity based on an Internet resource information database, according to one or more embodiments.

FIG. 1 is a block diagram of a system 100 for detecting malicious software activity based on an Internet resource information database 108 according to one embodiment. The system 100 may form a computing environment that comprises a server 106, a computer 104, an attack computer 102 and the Internet resource information database 108, where each is coupled to one another through a network 110.

The attack computer 102 may be a type of computing device (e.g., a laptop, a desktop, a Personal Digital Assistant (PDA) and/or the like) known to one of ordinary skill in the art having the benefit of this disclosure. The attack computer 102 includes one or more malicious software programs, such as malware 112 (e.g., spyware, worms, viruses, rootkits and/or the like). Generally, the attack computer 102 may be utilized by a hacker with an intention to upload the malware 112 onto a computer, such as the computer 104, and compromise sensitive data (e.g., intellectual property, customer data, medical histories, financial records, purchase orders, legal documents, privileged and/or confidential information, medical records, social security numbers, addresses, pictures, documents, contacts, and/or the like).

The computer 104 may be a type of computing device (e.g., a laptop, a desktop, a Personal Digital Assistant (PDA) and/or the like) known to one of ordinary skill in the art having the benefit of this disclosure. The computer 104 includes a monitor module 114 as explained further below. Generally, the computer 104 is utilized by the user to access various Internet resources (e.g., web pages, various content (e.g., dynamic or static content in the form of images, video and/or audio), online services (e.g., social networking), applications, databases and/or the like).

The server 106 may be a type of computing device (e.g., a laptop, a desktop, a Personal Digital Assistant (PDA) and/or the like) known to one of ordinary skill in the art having the benefit of this disclosure. The server 106 includes a query controller 116 as explained further below. Generally, the server 106 provides the computer 104 with various database services and/or applications. The server 106 manages and performs various database commands (e.g., queries) on the Internet resource information database 106 on behalf of the computer 104.

According to one or more embodiments, the Internet resource information database 108 includes records associated with one or more web pages, various content (e.g., dynamic or static content in the form of images, video and/or audio), online services (e.g., social networking), applications, databases and/or the like. These records further include various attributes associated with each application, such as an application identifier, source URL (Uniform Resource Locator) and/or a domain name (e.g., www.uspto.gov) and the like. In one embodiment, the Internet resource information database 108 includes a threat level that indicates an appropriate and/or an inappropriate time to access such Internet resources. For example, a high threat level may indicate that it may not be safe to access certain Internet resources, while a low threat level indicates that it is safe to visit the Internet resources.

The network 110 comprises a communication system that connects computers by wire, cable, fiber optic, and/or wireless links facilitated by various types of well-known network elements, such as hubs, switches, routers, and the like. For example, the network 110 may be part of a Local Area Network (LAN) (e.g., the Internet or intranet) using various communications infrastructure, such as Ethernet, WiFi, WiMax, General Packet Radio Service (GPRS), and the like. The network 110 may form a portion of a Storage Network Area (SAN) using various communications infrastructure, such as Ethernet, Fibre Channel, InfiniBand, Internet Small Computer System Interface (iSCSI) and/or the like. As an example, such a Storage Area Network (SAN) may include Fibre Channel switches and/or ISCSI block storage devices.

The malware 112 includes software code that when executed, causes degradation and disruption to stability and performance, respectively, of the computer 104. Once the malware 112 exerts control over the computer 104, the malware 112 may consume a significant portion of available resources at the computer 104 (e.g., processors, memory devices, network components and the like), which prevents legitimate and/or critical software applications from using such resources. As a result, certain important tasks are not performed which renders the computer 104 vulnerable to various problems, such as a system crash or a hard drive disk failure and/or the like.

In some embodiments, the monitor module 114 includes software code that is configured to prevent and/or mitigate activities associated with execution of the malware 112. As explained further below, a comparison between source and time information associated with downloaded applications with the Internet resource information database 108 to identify one or more suspicious applications. By monitoring execution of the one or more suspicious applications, the monitor module 114 may detect presence of malicious software code, such as the malware 112. In some embodiments, the monitor module 114 determines whether any suspicious application of the one or more suspicious applications exhibits malicious software activity.

Figure 2:
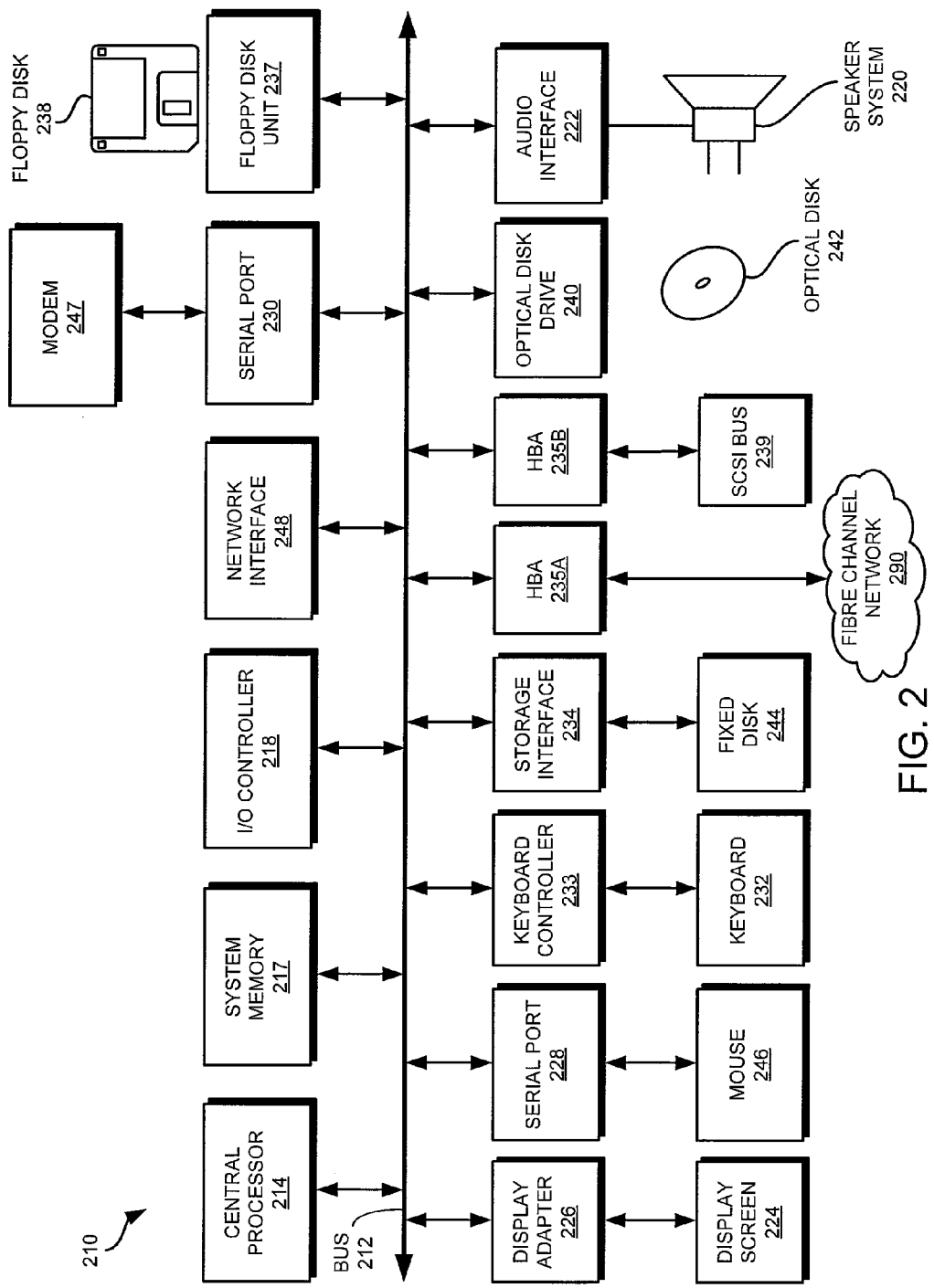
FIG. 2 is a block diagram of a suitable computer for implementing the present disclosure according to one or more embodiments.

FIG. 2 is a block diagram of a computer system 210 suitable for implementing the present disclosure. This system 210 is representative of a computer system that can be used to implement the computer 104 and/or the server 106 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an Internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
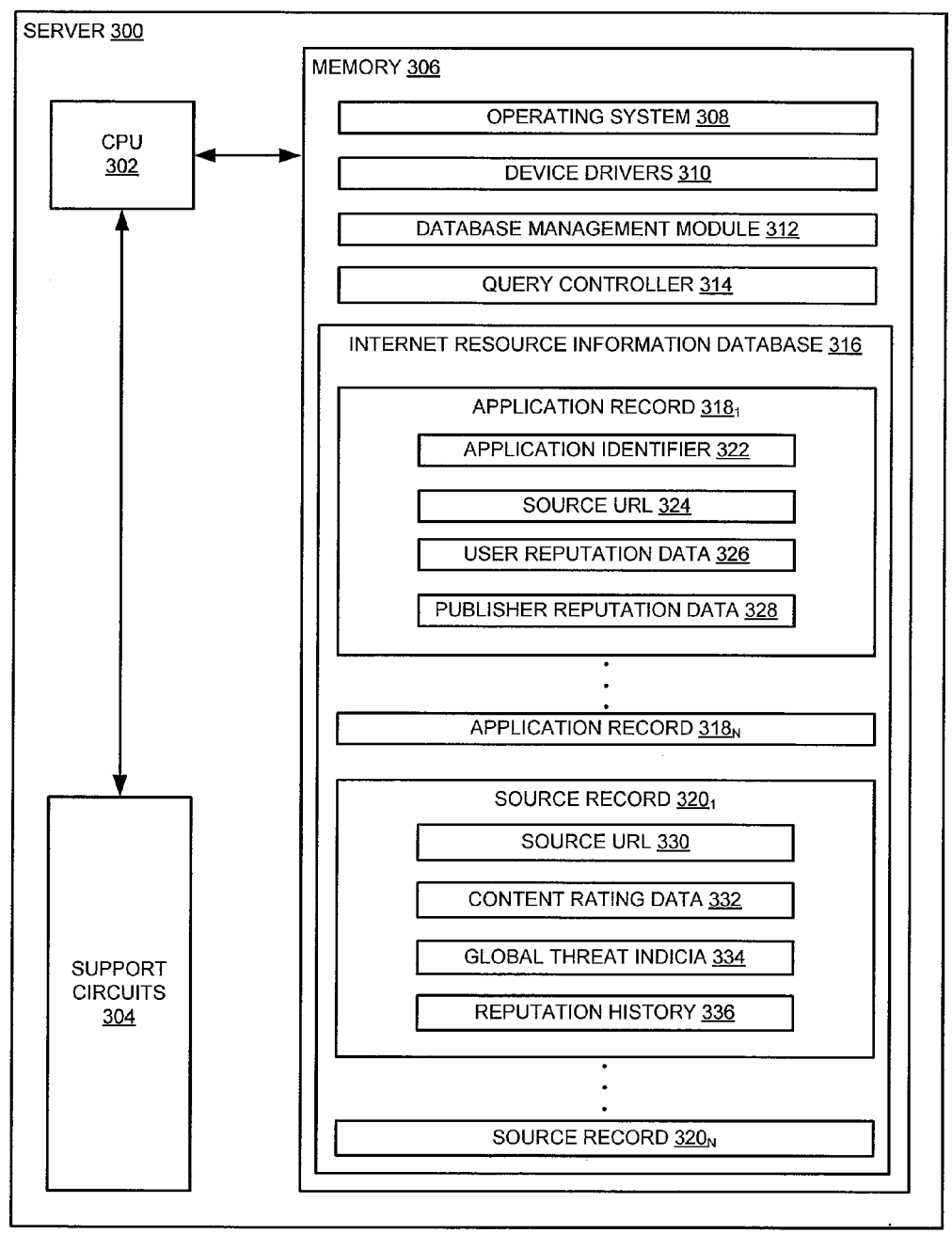
FIG. 3 is a block diagram of a server for detecting malicious software activity based on an Internet resource information database, according to one or more embodiments.

FIG. 3 is a block diagram of a server 300 for detecting malicious software activity based on an Internet resource information database according to one or more embodiments. The server 300 is a type of computing device (e.g., a laptop, a desktop and/or the like) that comprises a Central Processing Unit (CPU) 302, various support circuits 304 and a memory 306. The CPU 302 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a Read Only Memory, Random Access Memory, disk drive storage, optical storage, removable storage, and the like. The memory 306 includes various data and software packages, such as an operating system 308, device drivers 310, a database management module 312, a query controller 314 and an Internet resource information database 316.

The operating system 308 generally manages various computer resources (e.g., network resources, data storage resources, file system resources and/or the like). The operating system 308 is configured to execute operations on one or more hardware and/or software components, such as Network Interface Cards (NICs), hard disks, virtualization layers, firewalls and/or the like. For example, the various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the device drivers 310 to execute various file system and/or storage operations. As an example, the operating system 308 may utilize a device driver associated with a NIC card to communicate data to another computer as explained further below.

The database management module 312 may cooperate with the query controller 314 to access one or more records from the Internet resource information database 316 as described further below. The database management module 312 includes software code (e.g., processor executable instructions) that organizes and facilitates record retrieval from the Internet resource information database 316. The query controller 314 includes software code (e.g., processor executable instructions) for performing various database commands (e.g., relational database queries) on the Internet resource information database 316.

As soon as the database management module 312 receives a request (e.g., a query) from a monitor module (e.g., the monitor 114 of FIG. 1), the query controller 314 in the memory 306 is executed by one or more processors. The query controller 314 includes software code (e.g., processor executable instructions) that when executed processes one or more requests. For example, various software modules (e.g., the comparison module 418 of FIG. 4) may create one or more queries by utilizing a Structured Query Language (SQL). These software modules may then communicate the one or more queries to the query controller 314. Subsequently, the query controller 314 processes the one or more queries and retrieves one or more records from the Internet resource information database 316. Using information within the one or more retrieved records, the query controller 314 generates a reply that corresponds with the one or more queries.

The Internet resource information database 316 includes a plurality of application records 318 and a plurality of source records 320 according to various embodiments. Each of the plurality of application records 318 includes various attributes associated with one or more applications, such as an application identifier 322, a source Uniform Resource Locator (URL) 324, user reputation data 326 and publisher reputation data 328. For example, the application identifier 322 may be an attribute that includes a vendor, an application type, an application name, an application version number and/or the like. In one embodiment, the source Uniform Resource Locator (URL) 324 indicates a domain name associated with source webpage from which the application is downloaded.

The user reputation data 326 generally represents an overall computer system health associated with one or more computers that previously downloaded, installed and/or executed a particular application. In some embodiments, the user reputation data 326 may include a rating that reflects the stability and performance of the one or more computers, in accordance with a metric for evaluating computer system health. In some embodiments, such a rating may be based on the manner in which various users operate the one or more computers. For example, if the one or more computers function properly and robustly with little or no system crashes and/or data loss (i.e., good computer system health), then the user reputation data 326 may indicate that the particular application does not include malicious software code and thus, is safe to download and execute. Various database-based computer systems, such as Mr. Clean from SYMANTEC, may facilitate collection and maintenance of the user reputation data 326 from a plurality of networked computers.

The publisher reputation data 328 may represent market penetration and/or brand value associated with a particular computer resource provider (e.g., software and/or hardware vendors). The publisher reputation data 328 may indicate one or more legitimate computer resource providers associated with a particular application (e.g., white listed software and/or hardware vendors, such as VERITAS). For example, Deep Clean from SYMANTEC maintains information regarding known and legitimate publishers. A computer may safely download a software package from the Internet resource "www.symantec.com" because SYMANTEC is well-known and reputable computer resource provider. Unless hackers have compromised one or more web servers, reputable computer resource providers do not clandestinely distribute malware. In some embodiments, the publisher reputation data 328 may indicate one or more computer resource providers that are unknown and/or associated with malicious software activity.

Each of the plurality of source records 320 includes various attributes associated with an Internet resource (e.g., a web portal) that operates as a source for various computer resources, such as a source URL 330, a content rating data 332, global threat indicia 334, and a reputation history 336. For example, such an Internet resource may include a website from which a particular software application may be downloaded. In some embodiments, the source URL 330 may indicate a domain name that is assigned to the Internet resource and associated with an Internet Protocol (IP) address (e.g., a hostname, such as www.symantec.com) as well as a path to a particular web page. For example, if the software package is downloaded from www.symantec.com, then the corresponding value in the source URL 330 maintains the value www.symantec.com.

The content rating data 332 may represent trustworthiness and/or legitimacy of an Internet resource based on a metric for evaluating webpage contents (e.g., text, sound files, videos, links and/or the like). For example, Shasta from SYMANTEC maintains the content rating data 332 and warns the user if the user tries to download the application from a non trusted and/or illegitimate website. In some embodiments, the content rating data 332 indicates a trusted (i.e., white listed) website or an untrusted website.

In some embodiments, the Internet resource information database 316 also includes the global threat indicia 334, which may reflect various threat levels at any given moment in time. In some embodiments, the global threat indicia 334 may describe a threat level for a certain geographical region (e.g., Australia) in which a plurality of web servers host various Internet resources that transmit information throughout the world. The certain geographical region may experience different threat levels in which some may indicate a sudden burst of malicious software activity. Computers that download applications from the one or more web servers during such a sudden burst may have also accidently installed and/or executed malware as a result. For example, by infecting one or more computers, a virus may spread very quickly throughout an entire country through several techniques (e.g., email the virus as an attachment to each and every contact). As explained in further detail below, activities associated with each and every downloaded application may be monitored in order to detect the malware and mitigate the malicious software activity.

Each source record 320 within the Internet resource information database 316 further includes a reputation history 336 for recording various ratings associated with a particular Internet resource over a period of time. For example, a particular website may have a reputation as a legitimate source for software applications. After more information is collected, the particular website may change to a reputation for distributing malware. As such, any application downloaded prior to such a change may include malicious software code.

Figure 4:
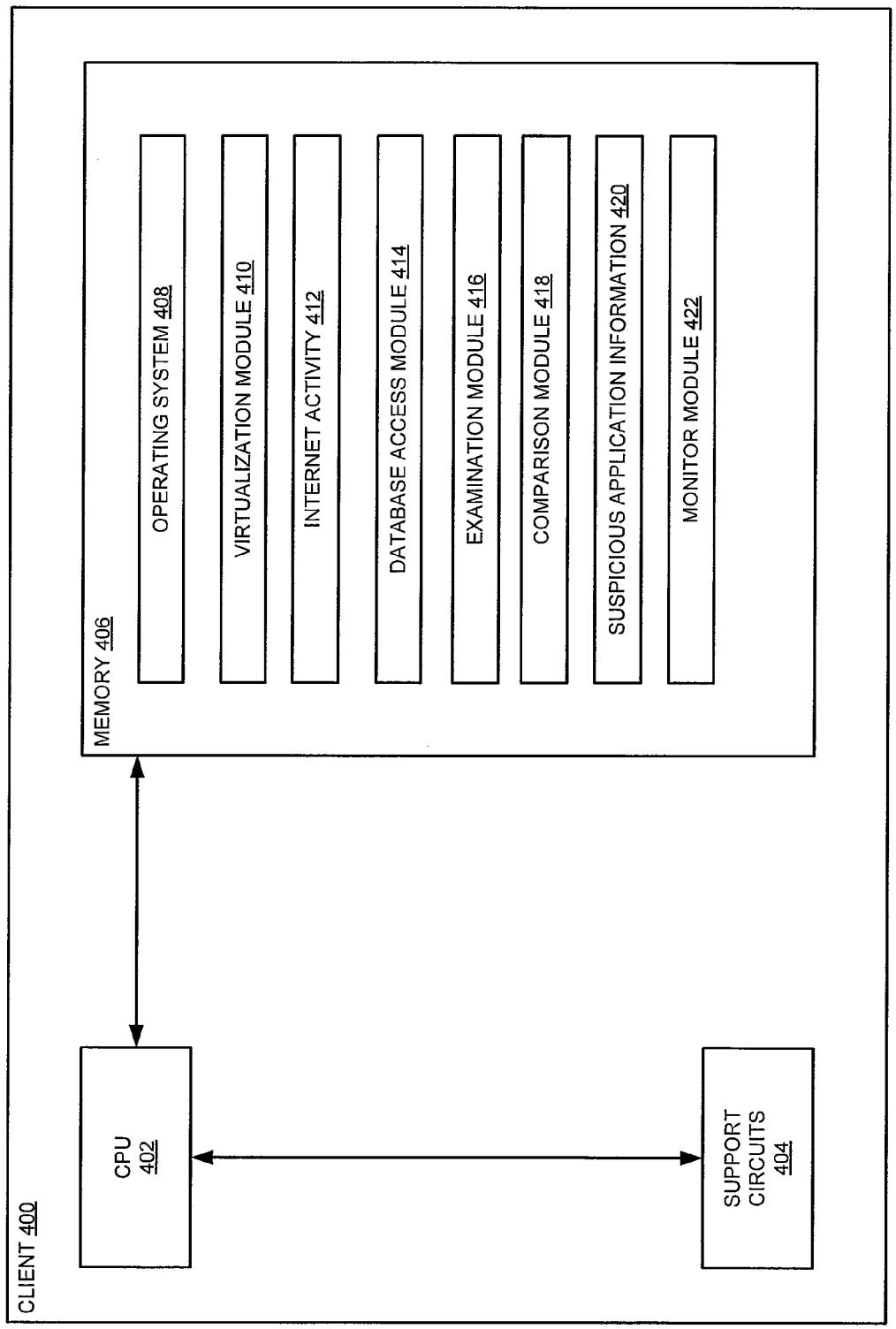
FIG. 4 is a block diagram of a client for detecting malicious software activity based on an Internet resource information database, according to one or more embodiments.

FIG. 4 is a block diagram of a client 400 for detecting malicious software activity, using one or more processors, based on an Internet resource information database according to one or more embodiments. The client 400 is a type of computing device (e.g., a laptop, a desktop and/or the like) that comprises a Central Processing Unit (CPU) 402, various support circuits 404 and a memory 406. The CPU 402 may comprise one or more commercially available microprocessors or microcontrollers that facilitate data processing and storage. Various support circuits 404 facilitate operation of the CPU 402 and may include clock circuits, buses, power supplies, input/output circuits and/or the like. The memory 406 includes a Read Only Memory, Random Access Memory, disk drive storage, optical storage, removable storage, and the like. The memory 406 includes various data and software packages, such as an operating system 408, a virtualization module 410, Internet activity 412, a database access module 414, an examination module 416, a comparison module 418, suspicious application information 420 and a monitor module 422.

The operating system 408 generally manages various computer resources (e.g., network resources, data storage resources, file system resources and/or the like). The operating system 408 is configured to execute operations on one or more hardware and/or software components, such as Network Interface Cards (NICs), hard disks, virtualization layers, firewalls and/or the like. For example, the various software packages call commands associated with the operating system 408 (i.e., native operating system commands) to perform various file system and/or storage operations, such as creating files or metadata, writing data to the files, reading data from the files, modifying metadata associated with the files and/or the like. The operating system 408 may call one or more functions to execute various file system and/or storage operations. The operating system 408 may call one or more functions associated with the virtualization module 410 to execute various operations to initiate a virtual machine. As an example, the operating system 408 may cooperate with the virtualization module 410 to generate a corresponding virtual machine such that a user of a computer may utilize the virtual machine in order to perform various operations and/or tasks.

The virtualization module 410 includes software code (e.g., processor executable instructions) that is executed by the CPU 402 to facilitate creation of a virtualization layer (e.g., a hypervisor) between one or more virtual machines and local and/or remote computer resources (e.g., computer memory, physical processors, hard disks and/or the like) associated with the client 400 as well as any other network storage devices as explained further below. The virtualization layer multiplexes the local and/or remote computer resources to the one or more virtual machines running on the client 400. Thus, the virtualization layer generated by the virtualization module 410 facilitates the necessary "virtual machine" abstraction.

The Internet activity 412 may include information associated with various content (e.g., dynamic or static content in the form of images, video and/or audio, online services (e.g., social networking), one or more applications, one or more databases) that may be accessed and/or downloaded from one or more Internet resources and/or executed on the client 400. In some embodiments, the Internet activity 412 may include time information associated with the accessed content. For example, the Internet activity 412 may indicate a time at which the client 400 downloaded an application from a particular website. The Internet activity 412 may also include source information associated with the downloaded application, such as a domain name of the particular website (e.g., www.uspto.gov), a time period during which a user viewed a particular website on the client 400 (e.g., 12:00-14:00 Hrs) and/or the like.

In one embodiment, the CPU 402 executes the database access module 414 stored in the memory 406, which is configured to facilitate data retrieval and query performance on an Internet resource information database (e.g., the Internet resource information database 108 of FIG. 1 and the Internet resource information database 316 of FIG. 3). The database access module 414 may cooperate with a database management module (e.g., the database management module 312 of FIG. 3) to examine various data records within the Internet resource information database.

In some embodiments, the examination module 416 includes software code (e.g., processor executable instructions) for determining source and time information associated with one or more downloaded applications. In some embodiments, when the CPU 402 recalls the instructions of the examination module 416 from the memory 406 and executes the examination module 416, the CPU 402 performing the tasks associated with the examination module 416, as recited above, form a means for identifying the source and time information associated with application downloads. In some embodiments, the examination module 416 processes the Internet activity 412 to identify a source URL and a time at which a user downloaded a particular application from an Internet resource that corresponds with the source URL. For example, the examination module 416 may examine a web browser history and extract the source URL and the download time.

The comparison module 418 includes software code (e.g., processor executable instructions) that may be configured to compare the source and time information with the Internet resource information database. In some embodiments, when the CPU 402 recalls the instructions of the comparison module 418 from the memory 406 and executes the comparison module 418, the CPU 402 performing the tasks associated with the comparison module 418, as recited above, form a means for comparing the Internet resource information database with the source and time information associated with application downloads to identify one or more suspicious applications. The comparison module 418 stores information associated with the one or more identified suspicious applications as the suspicious application information 420. As an example, for each suspicious application, the suspicious application information 422 may include an application identifier as well as related process information. The related process information may indicate one or more computer system processes that support the execution of a particular suspicious application.

In some embodiments, the comparison module 418 cooperates with the database access module 414 to communicate a request (e.g., a query) to the database management module. After the user downloads one or more applications from one or more Internet resources, the comparison module 418 instructs the database access module 414 to communicate the request to the database management module, which responds with various attributes associated with the one or more downloaded applications.

In some embodiments, the comparison module 418 may examine user reputation data and/or publisher reputation data that correspond with a particular application. For example, if computers that operate the particular application have poor computer system health, then the particular application may include malicious software code. Accordingly, the comparison module 418 updates the suspicious application information 420 with information associated with the particular application. As another example, if a rating that corresponds with the particular applications indicates a disreputable software publisher, then the particular application may include malicious software code.

In some embodiments, the comparison module 418 may examine content rating data associated with an Internet resource in order to identify the one or more suspicious applications. The Internet resource may function as a source for various applications. For example, if the Internet resource displays content having an untrustworthy rating, the Internet resource may be a disreputable source for software applications. The particular application, as a result, may include malicious software code.

In some embodiments, the comparison module 418 may examine global threat indicia associated with a time period during which the client 400 downloaded a particular application. For example, the time period may reflect a significant level of malicious activity. As such, the particular application may include malicious software code. The global threat indicia may also correspond with a particular geographical region. If the particular geographical region corresponds with a significant level of malicious activity, then the particular application most likely may include malicious software code and may be considered suspicious. In some embodiments, based on the global threat indicia, the comparison module 418 identifies the particular application as a suspicious application. As mentioned further below, once identified as suspicious, the monitor module 422 proceeds to monitor the particular application.

In some embodiments, the comparison module 418 may examine a reputation history associated with an Internet resource that operates as a source for various applications. The comparison module 418 may detect one or more fluctuations in the reputation history over a given time period. Based on these fluctuations, the comparison module identifies one or more suspicious applications. For example, if a rating associated with the Internet resource changed from reputable to disreputable, there is a strong likelihood that one or more downloaded applications may include malicious software code. In some embodiments, the comparison module 418 stores information associated with the one or more downloaded applications in the suspicious application information 420.

The monitor module 422 includes software code (e.g., processor executable instructions) that when executed by the CPU 402 monitors execution of one or more suspicious applications. In some embodiments, when the CPU 402 recalls the instructions of the monitor module 422 from the memory 406 and executes the monitor module 422, the CPU 402 performing the tasks associated with the monitor module 422, as recited above, form a means for monitoring activities associated with execution of the one or more suspicious applications. In some embodiments, after processing the suspicious application information 420, the monitor module 422 proceeds to transform the execution of the one or more suspicious applications. In one embodiment, the monitor module 422 terminates the execution of the one or more suspicious applications. For example, the monitor module 422 may instruct the operating system 408 to issue KILL commands for each and every process that corresponds with the one or more suspicious applications. Furthermore, the monitor module 422 may instruct the operating system 408 to delete any data in the memory 406 associated with the one or more suspicious applications.

In one or more embodiments, the monitor module 422 may cooperate with the virtualization module 410 to monitor activities associated with the execution of the one or more suspicious applications within a virtual machine. A virtual environment for executing the one or more suspicious application may be provided by various virtualization solutions, such as ALTIRIS Software Virtualization Software (SVS). The ALTIRIS SVS facilitates execution of the one or more suspicious applications through the virtualization layer.

In some embodiments, the monitor module 422 monitors and/or prevents Input/Output (I/O) activity of all such suspicious applications. For example, each and every application performs one or more file system and/or storage operations, such as modifying parts of a file system (e.g., system registry entries, boot files and/or the like), installing drivers, accessing data files and/or the like. Such operations are facilitated by burst of disk (e.g., Hard Disk Drive (HDD)) I/O activity (i.e. WRITE operations) at a file system level.

Additionally, the monitor module 422 (e.g., Norton Internet Security (NIS)) monitors network activity initiated by the suspicious application. In some embodiments, the monitor module 422 prevents any network activity associated with the execution of the one or more suspicious applications. For example, the suspicious application may attempt to establish a connection with an external computer (e.g., the attack computer 102 of FIG. 1) in order to download malware, leak sensitive information and/or the like. The monitor module 422 prevents such network activity by blocking a connection request, initiated by one or more suspicious applications, to the external and/or unknown computer.

In some embodiments, the suspicious application information 420 may include one or more suspicious applications that were previously identified as unsuspicious and/or safe. For example, the comparison module 418 may determine that a source URL corresponds with a legitimate website and therefore, a downloaded application is not suspicious. After some time, however, the comparison module 418 may perform a comparison between source URL and the Internet resource information database in which the source URL is determined to correspond with an illegitimate and disreputable website. Accordingly, the comparison module 418 scans the memory 406 to identify one or more applications that were also downloaded from the website. Once the application is detected as the malware, the monitor module 422 terminates the applications. In some embodiments, the monitor module 422 uninstalls the one or more applications from the client 400.

Figure 5:
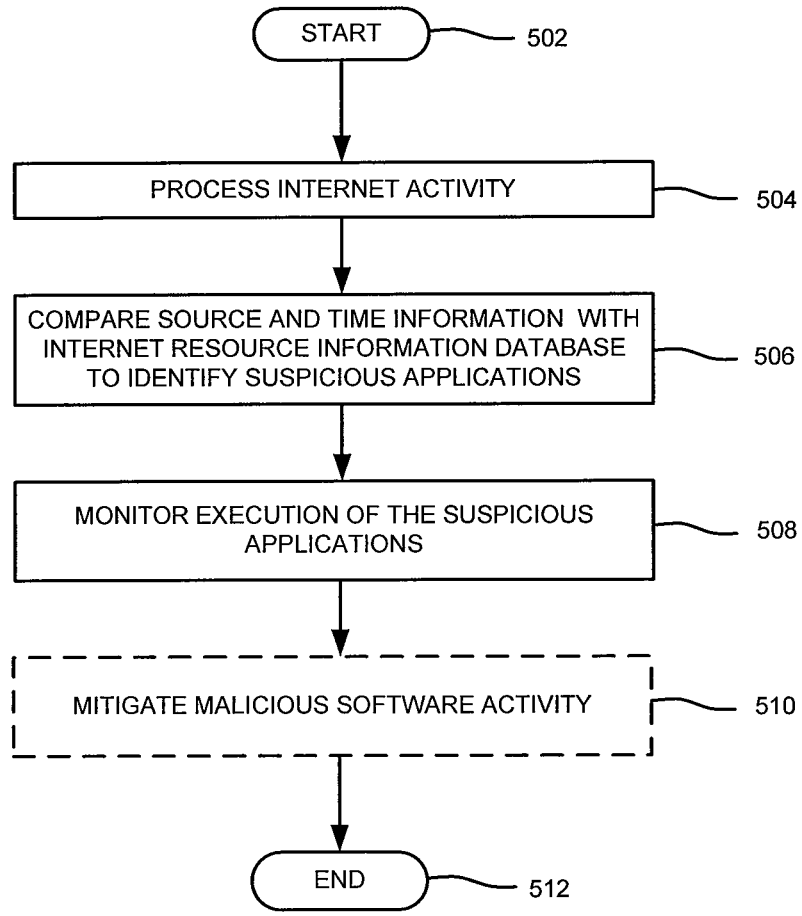
FIG. 5 is a flow diagram of a method for detecting malicious software activity based on an Internet resource information database, according to one or more embodiments.

FIG. 5 is a flow diagram of a method 500 for detecting malicious software activity based on an Internet resource information database according to one or more embodiments. In some embodiments, a monitor module (e.g., the monitor 114 of FIG. 1 and the monitor module 422 of FIG. 4) is executed by one or more processors to monitor execution of one or more suspicious applications as explained in the present disclosure.

The method 500 starts at step 502 and proceeds to step 504. At step 504, Internet activity (e.g., the Internet activity 412 of FIG. 4) is processed. In some embodiments, an examination module (e.g., the monitor module 422 of FIG. 4) processes the Internet activity performed on a computer (e.g., the computer 104 of FIG. 1 and the client 400 of FIG. 4 to determine source and time information associated with one or more downloaded applications.

At step 506, the source and time information is compared with the Internet resource information database to identify one or more suspicious applications. In one embodiment, a comparison module (e.g., the comparison module 418 of FIG. 4) in the memory (e.g., the memory 406 of FIG. 4) is executed by one or more processors (e.g., the CPU 402 of FIG. 4) to perform a comparison between the Internet resource information database (e.g., the Internet resource information database 108 of FIG. 1 and the Internet resource information database 316 of FIG. 3) with the source and time information associated with the one or more application downloads. Based on such a comparison, the comparison module may identify one or more suspicious application downloads. In some embodiments, the comparison module stores any comparison results in the memory (e.g., the memory 406 of FIG. 4) as suspicious application information (e.g., the suspicious application information 420 of FIG. 4).

In one embodiment, a database access module (e.g., the database access module 414 of FIG. 4) is executed by one or more processors (e.g., the CPU 402 of FIG. 4) to facilitate data record retrieval from the Internet resource information database (e.g., the Internet resource information database 108 of FIG. 1 and the Internet resource information database 316 of FIG. 3). The comparison module (e.g., the comparison module 418 of FIG. 4) calls the database access module (e.g., the database access module 414 of FIG. 4) to access one or more data records from the Internet resource information database. The database access module, in turn, cooperates with a database management module (e.g., the database management module 312 of FIG. 3) to facilitate access to the Internet resource information database.

In some embodiments, the comparison module communicates a request (e.g., a query) to a query controller (e.g., the query controller 116 of FIG. 1 and the query controller 314 of FIG. 3). In one or more embodiments, the query controller is executed by one or more processors to perform the request on the Internet resource information database. For example, the comparison module may communicate a query utilizing a query language (e.g., including but not limiting to Structured Query Language (SQL) and/or the like). In response, the query controller processes the query to retrieve information from one or more records from the Internet resource information database. For example, the query controller examines a plurality of application records (e.g., the application record 318 of FIG. 3) and plurality of source records (e.g., the source record 320 of FIG. 3) for one or more attributes that match criteria embedded within the query. After such an examination, the query controller communicates one or more portions of any matching records to the comparison module.

At step 508, execution of the one or more suspicious applications is monitored. In some embodiments, a monitor module (e.g., monitor module 422 of FIG. 4) includes software code (e.g., processor executable instructions) that, when executed by one or more processors, monitors execution of one or more suspicious applications. In some embodiments, the monitor module proceeds to monitor each and every activity performed during the execution the one or more suspicious applications, such as installing a driver, modifying parts of files (e.g., system registry entries and/or the like). At optional step 510, malicious software activity is mitigated. In one embodiment, the monitor module terminates the execution of the one or more suspicious applications. For example, the monitor module may instruct an operating system (e.g., the operating system 408 of FIG. 4) to delete any data in memory associated with the one or more suspicious applications.

In one or more embodiments, the monitor module may cooperate with a virtualization module (e.g., the virtualization module 410 of FIG. 4) to monitor activities associated with the execution of the one or more suspicious applications within a virtual machine. In some embodiments, the monitor module monitors and/or prevents Input/Output (I/O) activity of all such suspicious applications. In some embodiments, the monitor module 422 (e.g., Norton Internet Security (NIS)) may monitor and/or prevent network activity initiated by the suspicious application. For example, the suspicious application may attempt to establish a connection with an external computer (e.g., the attack computer 102 of FIG. 1) in order to download malware, leak sensitive information and/or the like. The monitor module prevents such network activity by blocking a connection request, initiated by one or more suspicious applications, to the external and/or unknown computer. At step 512, the method 500 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method for detecting malicious software activity, using at least one processor, based on an Internet resource information database in memory, comprising:
    processing Internet activity to determine source and time information associated with at least one downloaded application, wherein the source and time information is associated with a source URL and a time at which a user downloaded the at least one downloaded application;
    comparing the Internet resource information database with the source and time information associated with the at least one downloaded application to identify at least one suspicious application, wherein comparing comprises communicating a request to perform a query on the Internet resource information database for attributes that match criteria within the query, wherein the Internet resource information database comprises a reputation history associated with an internet resource and a threat level that indicates prior appropriate and/or inappropriate times to access the internet resource; and
    monitoring execution of the at least one suspicious application.

2. The method of claim 1 further comprising terminating the execution of the at least one suspicious application.

3. The method of claim 1, wherein monitoring the execution of the at least one suspicious application further comprises monitoring the execution of the at least one suspicious application in a virtual machine.

4. The method of claim 1 further comprising performing at least one of monitoring or preventing input/output activity associated with the execution of the at least one suspicious application.

5. The method of claim 1 further comprising performing at least one of monitoring or preventing network activity associated with the execution of the at least one suspicious application.

6. The method of claim 5, wherein performing the at least one monitoring or preventing further comprises blocking a connection request to an external computer from the at least one suspicious application.

7. The method of claim 1, wherein the Internet resource information database comprises at least one of user reputation data or publisher reputation data associated with a plurality of applications.

8. The method of claim 1, wherein the Internet resource information database further comprises at least one of content rating data or a global threat indicia associated with a plurality of sources.

9. The method of claim 1, wherein monitoring the execution of the at least one suspicious application further comprises transforming the execution of the at least one suspicious application.

10. An apparatus for detecting malicious software activity, using at least one processor, based on an Internet resource information database in memory, comprising:
 means for identifying source and time information associated with at least one application download, wherein the source and time information is associated with a source URL and a time at which a user downloaded the at least one downloaded application;
 means for comparing the Internet resource information database with the source and time information associated with the at least one downloaded application to identify at least one suspicious application, wherein comparing comprises communicating a request to perform a query on the Internet resource information database for attributes that match criteria within the query, wherein the Internet resource information database comprises a reputation history associated with an internet resource and a threat level that indicates prior appropriate and/or inappropriate times to access the internet resource; and
 means for monitoring activities associated with execution of the at least one suspicious application.

11. The apparatus of claim 10 further comprising means for transforming the activities associated with the execution of at least one suspicious application.

12. The apparatus of claim 10 further comprising means for executing the at least one suspicious application in a virtual machine.

13. The apparatus of claim 10 further comprising means for terminating the execution of the at least one suspicious application.

14. The apparatus of claim 10 further comprising means for preventing input/output activity associated with the execution of the at least one suspicious application.

15. The apparatus of claim 10 further comprising means for preventing network activity associated with the execution of the at least one suspicious application.

16. A non-transitory computer-readable-storage medium comprising one or more processor-executable instructions that, when executed by at least one processor, causes the at least one processor to:
 examine Internet activity to determine source and time information associated with at least one downloaded application, wherein the source and time information is associated with a source URL and a time at which a user downloaded the at least one downloaded application;
 access an Internet resource information database to identify at least one suspicious application, wherein accessing comprises communicating a request to perform a query on the Internet resource information database for attributes that match criteria within the query, wherein the Internet resource information database comprises a reputation history associated with an internet resource and a threat level that indicates prior appropriate and/or inappropriate times to access the internet resource;
 monitor execution of the at least one suspicious application.

17. The non-transitory computer-readable-storage medium of claim 16 further comprising one or more processor-executable instructions that, when executed by the at least one processor, causes the at least one processor to:
 terminate the execution of the at least one suspicious application.

18. The non-transitory computer-readable-storage medium of claim 16 further comprising one or more processor-executable instructions that, when executed by the at least one processor, causes the at least one processor to:
 transform the execution of the at least one suspicious application.

19. The non-transitory computer-readable-storage medium of claim 16 further comprising one or more processor-executable instructions that, when executed by the at least one processor, causes the at least one processor to:
 prevent input/output activity associated with the execution of the at least one suspicious application.

20. The non-transitory computer-readable-storage medium of claim 16 further comprising one or more processor-executable instructions that, when executed by the at least one processor, causes the at least one processor to:
 block a connection request to an external computer from the at least one suspicious application.

* * * * *